United States Patent
Li

(10) Patent No.: US 9,294,171 B2
(45) Date of Patent: Mar. 22, 2016

(54) BASE STATION CALIBRATION

(71) Applicant: Alcatel-Lucent USA Inc., Murray Hill, NJ (US)

(72) Inventor: Li E. Li, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 63 days.

(21) Appl. No.: 14/225,559

(22) Filed: Mar. 26, 2014

(65) Prior Publication Data

US 2015/0280797 A1 Oct. 1, 2015

(51) Int. Cl.
*H04B 17/12* (2015.01)
*H04B 7/04* (2006.01)
*H04B 17/21* (2015.01)

(52) U.S. Cl.
CPC .............. *H04B 7/0452* (2013.01); *H04B 17/12* (2015.01); *H04B 17/21* (2015.01)

(58) Field of Classification Search
None
See application file for complete search history.

(56) References Cited

U.S. PATENT DOCUMENTS 7,653,120 B2 1/2010 Chen et al.

OTHER PUBLICATIONS

Clayton Shepard et al., "Argos: Practical Many-Antenna Base Stations," MobiCom '12, Istanbul, Turkey, Aug. 22-26, 2012, 12 pgs.
"Universal Mobile Telecommunications System (UMTS)," ETSI TS 121 101 V8.4.0 (2012-03), Technical Specifications and Technical Reports for a UTRAN-based 3GPP System (3GPP TS 21.101 version 8.4.0 Release 8), pp. Title-41.
Rogalin, R., et al. "Hardware-Impairment Compensation for Enabling Distributed Large-Scale MIMO." 2013 Information Theory and Applications Workshop (ITA), 10 pages.
Shepard, Clayton, et al. "Argos: Practical many-antenna base stations." Proceedings of the 18th annual international conference on Mobile computing and networking. ACM, 2012.

*Primary Examiner* — Omar Ghowrwal
(74) *Attorney, Agent, or Firm* — Mendelsohn, Dunleavy, P.C.; Steven Mendelsohn

(57) ABSTRACT

In one embodiment, an LSAS base station has a tree architecture including a central controller at the tree root, one or more intermediate levels of hubs forming tree branches, and an antenna module for each service antenna at a tree leaf. To calibrate an overall ratio characterizing differences between downlink and uplink channels between the central controller and each antenna module, neighbor-calibration procedures are calibrate neighbor ratios between parent nodes and their child nodes. Appropriate neighbor ratios are multiplied to generate overall ratios. To reduce time required to perform the neighbor-calibration procedures, odd and even phases are performed. In the odd phase, neighbor ratios are generated between parents in all odd levels and their children in even levels, and analogously for the even phase for even-level parents and odd-level children. Within each phase, independent parent-child pairs can be calibrated simultaneously.

18 Claims, 2 Drawing Sheets

BASE STATION CALIBRATION

BACKGROUND

1. Field of the Invention

The invention relates to cellular wireless communication that uses multiple antennas to achieve improved network performance.

2. Description of the Related Art

This section introduces aspects that may help facilitate a better understanding of the invention. Accordingly, the statements of this section are to be read in this light and are not to be understood as admissions about what is prior art or what is not prior art.

An LSAS (large-scale antenna system) communication network has a number of base stations distributed over a geographic region, where each base station has a multi-antenna array that is used to communicate with each of one or more terminals (e.g., wireless mobile units) located within the coverage area of the base station. The essence of LSAS is that large numbers of service antennas communicate with a smaller number of terminals all using the same time/frequency resources. Knowledge by the service antennas of the propagation channels to the terminals enables, on the downlink, the focusing of simultaneous data-bearing beams to the terminals and, on the uplink, the separation of the data-bearing transmissions that are simultaneously transmitted by the terminals. Adding more service antennas produces sharper downlink beams and better discrimination of the individual uplink transmissions. Each terminal has (i) a different uplink channel having unique uplink characteristics to each service antenna of a base station and (ii) a different downlink channel having unique downlink characteristics from that service antenna.

In order to successfully recover information transmitted from each of its terminals, each base station (post-)compensates its received uplink signals based on estimated uplink channel coefficients that characterize the different uplink channels through which the uplink signals have propagated from the different terminals to the base station's service antennas. In addition, in order to ensure that its terminals will be able to successfully recover information from its transmitted downlink signals, each base station (pre-)compensates its transmitted downlink signals based on estimated downlink channel coefficients that characterize the different downlink channels through with the downlink signals will propagate from the base station's service antennas to the different terminals.

Each uplink and downlink channel includes both (i) a wireless (i.e., over-the-air) portion corresponding to the air link between a base station service antenna and a terminal over which the uplink/downlink signals are transmitted and (ii) wired portions corresponding to the transceiver circuitries at the base station and terminal that process those uplink/downlink signals. The channel characteristics of the over-the-air portions of uplink/downlink channels typically change much faster than the channel characteristics of the wired portions of those channels. Furthermore, at any given time, the channel characteristics of the over-the-air portion of an uplink channel from a terminal to a base station service antenna are substantially identical to the channel characteristics of the over-the-air portion of the corresponding downlink channel from that same base station service antenna to that same terminal. However, the channel characteristics of the wired portion of that uplink channel can be substantially different from the channel characteristics of the wired portion of that corresponding downlink channel.

To generate estimated uplink channel coefficients, each terminal periodically (e.g., once every coherence interval) transmits a known pilot sequence that the base station uses to estimate the characteristics of the different uplink channels. The base station then uses those estimated uplink channel coefficients to post-process its received uplink channels. In order to generate estimated downlink channel coefficients to be used to pre-process its downlink signals, each base station modifies its uplink channel coefficients based on calibrated differences between (i) the uplink channel characteristics of its wired portion of an uplink channel and (ii) the downlink channel characteristics of its wired portion of the corresponding downlink channel.

Conventional techniques for calibrating the channel differences between a base station's uplink and downlink wired portions include using a special reference antenna built into the base station's antenna array to (i) transmit special uplink calibration signals to the base station's service antennas and/or (ii) receive special downlink calibrations signals from the base station's service antennas.

As LSAS antenna arrays get larger, the use of such special reference antennas becomes impractical. First of all, the time it takes to complete the calibration process is proportional to the number of service antennas. Furthermore, in order to simplify the decision of transmission power of the reference antenna, the reference antenna has to be placed in a position so that its horizontal distances to the different service antennas are approximately identical. During the calibration process, the reference antenna communicates with the service antennas over the air such that the LSAS system cannot serve the terminals at that time. Moreover, the placement constraint of the reference antenna makes it difficult for the reference antenna to be in the same enclosure used for the service antennas.

SUMMARY

In one embodiment, the present invention is a base station and a method for calibrating such a base station having a plurality of nodes comprising a central controller, a plurality of hubs, and a plurality of antenna modules connected in an L-level tree architecture. The central controller is at Level 1 of the tree architecture and is connected to one or more hubs at Level 2. Each hub at Level I, $1<I<L-1$, is connected to one or more hubs at Level I+1. Each hub at Level L−1 is connected to one or more antenna modules at Level L. A neighbor ratio is generated between each parent node at Level i, $0<i<L$, and each of its one or more child nodes at Level i+1. An overall ratio is generated between the central controller and each antenna module based on a corresponding subset of the neighbor ratios.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

This disclosure describes a technique that eliminates the need for a reference antenna and reduces the time it takes to complete the calibration process. Leveraging a fat-tree structure of an LSAS system, each node in the fat tree calibrates with its one or more children nodes. The calibration process starts from the root of the LSAS system (e.g., a central controller). The root calibrates with its one or more children nodes. The process terminates at the leaf nodes, i.e., the service antennas. At the leaf, each service antenna essentially completes calibration with the root.

Fundamentals of LSAS

Large-Scale Antenna Systems (LSAS) (variously called Massive MIMO, Large-Scale MIMO, Hyper-MIMO, and ARGOS) are now attracting considerable attention in the wireless community. LSAS can be classified as a multi-user MIMO (Multiple-Input Multiple-Output) wireless communication scheme that is distinguished by (a) unprecedented numbers of service antennas and (b) a large ratio of service antennas to terminals under active service. The attendant problem of providing the service antennas with channel-state information (CSI) (i.e., estimates of propagation channels between the service antennas and the terminals) is handled by utilizing time-division duplex (TDD) operation and uplink pilots that are transmitted by the terminals, combined with TDD reciprocity. The CSI is used, on the downlink, to enable the service antennas simultaneously (in the same time/frequency bins) to transmit information-bearing symbols selectively to the terminals and, on the uplink, to distinguish the information-bearing symbols that are transmitted simultaneously (in the same time/frequency bins) by the terminals. By using TDD in the manner indicated, the time to acquire CSI is independent of the number of service antennas. Hence, LSAS is scalable in an unlimited manner with respect to service antennas. Deploying additional service antennas always helps. In particular, multiplexing selectivity always improves, and total radiated power can be reduced in proportion to the number of service antennas. Other advantages of expanding the number of service antennas include that the simplest multiplexing signal processing can be nearly optimal, the effective channel frequency response is flattened, power control is greatly simplified, and small numbers of expensive ultra-linear electronic devices can be replaced by many low-cost reduced-performance devices.

LSAS Slot

Figure 1:
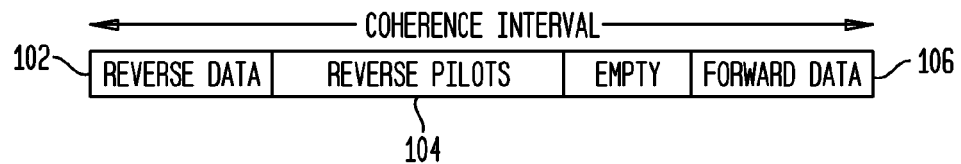
FIG. 1 shows a representation of a coherence interval or slot for an LSAS system.

FIG. 1 shows a representation of a coherence interval or slot 100 for an LSAS system. As shown in FIG. 1, the principle activities of LSAS take place within the duration of each coherence interval 100 during which it is assumed that nothing moves more than about ¼ wavelength, so that the propagation channels are nearly constant. Under TDD operation, the same frequency band is used for both the uplink and the downlink.

The central operation in the coherence interval is transmission of pilot sequences 104 by the terminals on the uplink, from which the service antennas can estimate the CSI for the uplink propagation channels.

Pilot transmission is preceded by uplink data transmission 102 (in other implementations, the order could be reversed). Here, the terminals (which normally would be single-antenna terminals, although multiple-antenna terminals are possible) simply transmit message-bearing symbols simultaneously using the same time/frequency resources, subject to possible power-control rules. The service antennas collectively process their received signals, combined with their acquired CSI, to distinguish the individual transmissions. An advantage of having a large excess of service antennas over terminals is that simple linear de-coding (e.g., de-multiplexing) can be nearly optimal. Specific linear combinations of the message-bearing signals received by the service antennas yield estimates for the message-bearing symbol for the terminals, where the combining coefficients depend on the channel estimates.

Pilot transmission is followed by downlink data transmission 106. Again, a large excess of service antennas over terminals is desirable, since it renders linear pre-coding (e.g., multiplexing) nearly optimal. The linear pre-coding operation multiplies a vector of message-bearing symbols intended for the terminals by a matrix, whose elements depend on the channel estimates, to create a vector of signals which the service antennas jointly transmit. The linear pre-coding may incorporate power control as well. The effect of the linear pre-coding is that each terminal receives the message-bearing symbol intended for it with minimal interference from the symbols that are directed at the other terminals.

OFDM Implementation of LSAS

The following assumes an OFDM (Orthogonal Frequency-Division Multiplexing) implementation of LSAS. However, time-domain implementations remain a possibility, or even Channel-Adaptive Waveform Modulation, as described in U.S. Pat. No. 7,653,120, the teachings of which are incorporated herein by reference in their entirety.

Assume, without loss of generality, LTE (long-term evaluation)-typical values for the OFDM parameters (in seconds): symbol interval $$T_s = \frac{10^{-3}}{14},$$

guard interval $$T_g = \frac{T_s}{15},$$

and usable symbol interval $$T_u = T_s - T_g = \frac{10^{-3}}{15}.$$

The guard interval is chosen to be at least as great as the channel delay spread $T_d$. Assuming the worst case of $T_d = T_g$, the Nyquist-sampling frequency interval, in Hertz, is equal to the reciprocal of the guard interval or, in tones, is equal to $$\frac{T_u}{T_g} = 14.$$

It is convenient, therefore, to treat the propagation channels as being piecewise constant over intervals of fourteen tones, which intervals can be conveniently called frequency-smoothness intervals.

The equivalent sample duration T of the LSAS coherence interval is equal to the frequency-smoothness interval times the number of OFDM symbols in the slot, given by Equation (1) as follows:

$$T = \frac{T_u}{T_g} \frac{T_{sl}}{T_s}, \quad (1)$$
$$= \frac{14 T_{sl}}{T_s}$$

where $T_{sl}$ is the duration of the coherence-interval slot, and $T_s$ is the duration of each OFDM symbol. A one-millisecond slot, for example, contains exactly fourteen OFDM symbols, so the sample duration is $T=14 \times 14=196$ symbols. The significance of the slot sample duration is that it represents the number of independent uses of the channel within each piecewise-constant frequency smoothness interval.

Uplink Pilot Sequences, Channel Estimation, and Pilot Contamination

The service antennas derive their knowledge of the uplink channels (and by virtue of TDD reciprocity their knowledge of the downlink channels) from known pilot (training) signals that are transmitted by the terminals. In an OFDM implementation, the transmission of pilot signals occurs separately in each of the tone intervals in which the frequency response is approximately piecewise constant. The pilot signals, therefore, are indexed by both tone and OFDM symbol (the pilots may span more than one OFDM symbol). For a given set of K terminals, the most-efficient pilot sequences are mutually orthogonal and of total sample duration $\tau_r$ greater than or equal to K. Trivially, each terminal could transmit a one-sample pilot while all other terminals are silent, but the quality of the channel estimates is improved if every terminal transmits at full power for all $\tau_r$ samples. Hence, harmonically-related orthogonal complex sine waves make ideal pilot sequences, for example. The terminals transmit their pilot sequences synchronously, and each service antenna correlates its received pilot signal with each of the K pilot sequences, which, after scaling, yields the estimate for the channel between itself and that particular terminal. Note that each service antenna derives its channel estimates independently of the other service antennas.

If $K > \tau_r$, then the pilot sequences cannot be perfectly orthogonal, and any attempt to estimate the channels on the basis of the received pilot signals alone will result in correlated channel estimates, whereby the channel estimate to the k-th terminal, for example, is corrupted by a linear combination of channels to all other terminals whose pilot sequences are correlated with the k-th pilot sequence. This correlation, called pilot contamination, results in directed interference when LSAS utilizes the channel estimates for downlink multiplexing and uplink de-multiplexing. For example, in directing a message-bearing symbol to the k-th terminal, the service antennas are inadvertently directing the same symbol to other terminals whose pilot sequences are correlated with the k-th pilot sequence. The power of this directed interference increases with the number of service antennas at the same rate as the desired signal.

For a given slot duration, the maximum number of orthogonal pilot sequences is equal to the sample duration T, and using pilots of this duration would leave no slot time for transmitting data. In general, the slot duration cannot be lengthened arbitrarily because of the mobility of the terminals, i.e., $$T_{sl} < \frac{\lambda}{4v},$$

where v is the speed of the terminals and $\lambda$ is the wavelength. Therefore, the maximum number of terminals that can be served simultaneously without incurring pilot contamination is given by Equation (2) as follows:

$$K < T = \frac{T_u}{T_g} \frac{T_{sl}}{T_s} < \frac{\lambda T_u}{4 v T_g T_s}. \quad (2)$$

Uplink Data Transmission

The K terminals transmit uplink data synchronously, and the k-th terminal transmits a message-bearing (e.g., QAM or quadrature amplitude modulation) symbol $q_k$ times a power-control variable $\eta_k^{1/2}$ where, for the sake of simplicity, subscripts denoting the tone index and OFDM symbol index are suppressed. Collectively, the terminals transmit a K×1 vector $s_r = D_\eta^{1/2} q$, where $D_\eta^{1/2}$ is the K×K diagonal matrix whose diagonal elements are the power-control parameters, and q is the K×1 vector of QAM symbols. The M service antennas collectively receive an m×1 vector $x_r = \sqrt{\rho_r} G D_\eta^{1/2} q + w_r$, where G is an M×K matrix that represents the channel frequency response between the terminals and the service antennas, $w_r$ represents additive receiver noise and interference, and $\rho_r$ is a scalar that represents overall channel strength. Again, subscripts denoting tone index and OFDM symbol index are suppressed for simplicity.

The matrix-valued propagation channel mixes the message-bearing symbols together, and LSAS processes the received signal to restore the individual message-bearing symbols. It does this by multiplying the received signal by a K×M de-coding (de-multiplexing) matrix, which itself depends on the channel estimates $\hat{q} = A_r x_r$. Two common choices for the de-coding matrix correspond to (i) matched filtering $A_r \propto \hat{G}^H$, where the superscript "H" denotes "conjugate transpose," and (ii) zero forcing $A_r \propto (\hat{G}^H \hat{G})^{-1} \hat{G}^H$. In the absence of channel-estimation error and noise, zero forcing will recover the individual QAM symbols perfectly, while matched filtering requires perfect orthogonality of the channels to the terminals (e.g., the column vectors of G have to be orthogonal) for perfect recovery. It happens that, as the number of service antennas grows large compared with the number of terminals, asymptotic orthogonality tends to occur, and the performance gap between matched filtering and zero forcing decreases. Indeed, at sufficiently low SINRs (signal-to-interference-plus-noise ratios), matched filtering may outperform zero forcing.

An advantage of matched filtering over zero forcing is that the former can be realized by a decentralized system architecture whereby each service antenna processes its own received message-bearing signal independently of the other service antennas. This lends great resilience to the system—if some of the service antennas are lost, the system continues to run without disruption—and it permits the system to be expanded without significant changes to the existing system.

Downlink Data Transmission

On downlink, the service antennas want selectively to transmit a QAM symbol to each of K terminals. Denote the K×1 vector of QAM symbols by q, which is multiplied by a M×K pre-coding (multiplexing) matrix $A_f$ to create the M×1 vector of signals $s_f = A_f q$ that are collectively transmitted by the service antennas. Collectively, the K autonomous terminals receive the K×1 vector $x_f = \sqrt{\rho_f} G^T A_f q + w_f$, where $w_f$ is additive noise and interference, and $\rho_f$ is a scalar that represents overall channel strength. Two common choices for the pre-coding matrix $A_f$ correspond to conjugate beamforming $A_r \propto \hat{G}^*$, where the superscript "*" denotes "complex conjugate," and zero forcing $A_r \propto \hat{G}^*(\hat{G}^T\hat{G}^*)^{-1}$. As in the case of uplink data transmission, the asymptotic orthogonality of downlink channels to the terminals increasingly benefits conjugate beamforming as the number of service antennas grows.

Conventional TDD Calibration

C. Shepard, H. Yu, N. Anand, L. Erran Li, T. L. Marzetta, R. Yang, L. Thong, "*Argos: Practical Many-Antenna Base Stations*," Proc. ACM MOBICOM, August 2012, the teachings of which are incorporated herein by reference, describes an internal calibration procedure. In more details, one of the service antennas is selected as a reference antenna. The remaining M-1 service antennas at the LSAS system calibrate with respect to the reference antenna using two-way wireless transmissions. This calibration procedure takes M sequential steps. R. Rogalin, O. Y. Bursalioglu, H. C. Papadopoulos, G. Caire, A. F. Molisch, "Hardware-impairment compensation for enabling distributed large-scale MIMO," Information Theory and Applications Workshop (ITA), 2013, the teachings of which are incorporated herein by reference, generalizes this calibration procedure to the setting of large sets of nodes that are dispersed over wide area. To provide calibration between these large sets of nodes, hierarchical calibration is used. In its simplest two-layer case, the network is first split into small-size clusters. Then, an intra-cluster calibration procedure is performed, followed by an inter-cluster calibration procedure.

LSAS System Architecture and Scalable Channel Calibration

In the following discussion, assume that, on the downlink, conjugate beamforming is employed for multiplexing and that, on the uplink, matched filtering is used for de-multiplexing.

LSAS System Architecture

The LSAS architecture can be any suitable topology. A preferred topology should be well balanced with enough redundancy so that any link or node failure will not disconnect a large number of antenna modules. The following embodiment uses a fat-tree architecture. For any other topology, a sub-topology called a Steiner tree is first computed. A Steiner tree connects all antenna modules by a tree with a distinct root. A Steiner tree with small depths is desirable, where the depth difference between antenna modules should be small as well. It is also desirable that the largest degree of any node be small. The three bounds can be predefined. A heuristic algorithm is then applied to find such a sub-topology. Essentially, a breadth-first search is run with those three constraints.

Figure 2:
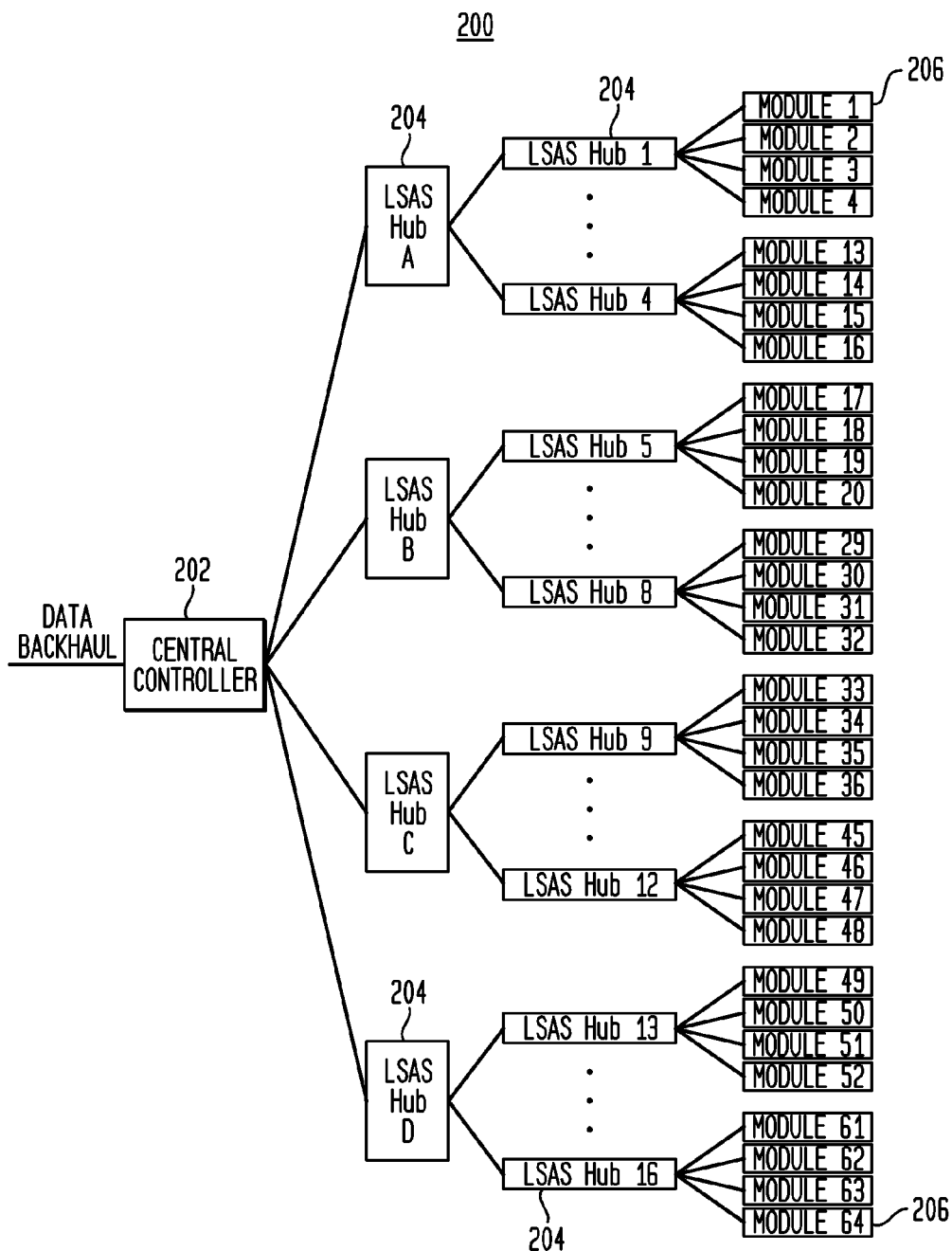
FIG. 2 shows a block diagram representing the fat-tree architecture proposed for an LSAS base station.

FIG. 2 shows a block diagram representing the fat-tree architecture proposed for an LSAS base station 200 in order to scale to large numbers of antennas. As shown in FIG. 2, base station 200 includes a central controller 202, a number of LSAS hubs 204, and M antenna modules 206.

Although, in theory, a number of antenna modules 206 can be daisy-chained at the leaf of the tree, and each antenna module 206 can have several radios, where each radio corresponds to a different service antenna, for ease of description, the following discussion will assume that each leaf node has one antenna module 206 having one radio (not shown in FIG. 2) equipped with one service antenna (not shown in FIG. 2). For downlink, the central controller 202 distributes the QAM symbols using broadcast. The central controller 202 also synchronizes the clock and sends a transmission synchronization signal so that all antenna modules 206 can transmit at the same time.

In the exemplary implementation of FIG. 2, LSAS base station 200 has L=4 levels:

Level 1 having central controller 202 connected to four children LSAS hubs 204 in Level 2;

Level 2 having four LSAS hubs 204, each connected to four children LSAS hub 204 in Level 3;

Level 3 having 16 LSAS hubs 204, each connected to four children antenna modules 206 in Level 4; and Level 4 having M=64 antenna modules 206.

In exemplary LSAS base station 200, each parent node has four children nodes (i.e., the fan-out value is four for all parent nodes). Other implementations of LSAS base stations of the present disclosure can have any suitable number L of levels and/or different numbers of LSAS hubs in different ones of Levels 2 through L-1 and/or different fan-out values for different parent nodes and/or different total numbers M of service antennas.

For uplink processing, each antenna module 206 de-multiplexes the received signal into K I and Q sample streams, one pair of I and Q sample streams from each small cell base station (also known as terminal). At each upstream LSAS hub 204, the I and Q samples are summed together for each terminal. When the central controller 202 receives the signal, it can decode the resulting K I and Q sample streams.

Figure 3:
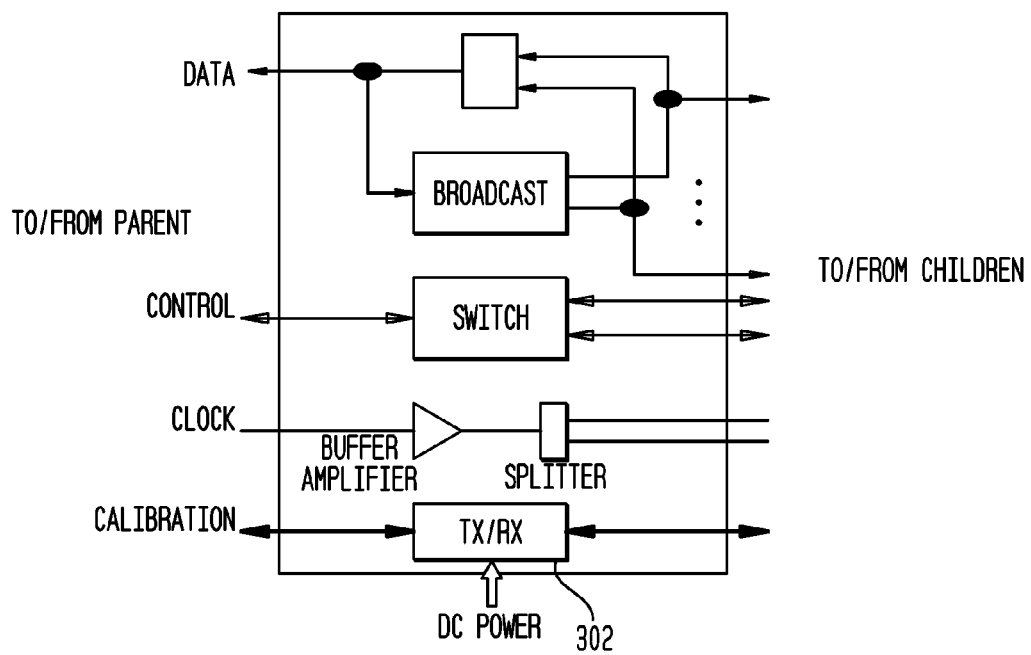
FIG. 3 shows a simplified block diagram of an LSAS hub that can be used to implement each LSAS hub of FIG. 2.

FIG. 3 shows a simplified block diagram of an LSAS hub 300 that can be used to implement each LSAS hub 204 of FIG. 2. LSAS hub 300 connects to its parent (which, depending on its location in the tree architecture, can be either central controller 202 or another LSAS hub 204 of FIG. 2) and to its one or more children (which can be either one or more other LSAS hubs 204 or one or more antenna modules 206 of FIG. 2). Note that the children of a particular LSAS hub can include one or more LSAS hubs and one or more antenna modules. Such non-tree topologies are acceptable as long as they include a tree collecting a root to all of the antenna modules (the sub-structre is called a Steiner tree). LSAS hub 300 has four types of logical links to its parent and its child (ren): data (e.g., QAM symbols), control, clock, and calibration. Control information (slow-fading coefficients, service requests, configuration parameters, power-control variables) is sent upstream towards the central controller 202 in the uplink and forwarded to appropriate downstream nodes. Calibration links are used for calibration procedures explained below.

Scalable Channel Calibration

In theory, for base station 200 of FIG. B to calibrate the difference between (i) the local downlink transmission path from central controller 202 to a particular service-channel module 206 and (ii) the local uplink transmission path from that antenna module 206 to central controller 202, a known calibration signal could be transmitted in the downlink direction from the central controller to the service-channel module via the one or more intervening LSAS hubs 204, and the calibration signal as received at that service-channel module could then be transmitted in the uplink direction from the service-channel module back to the central controller via those same one or more intervening LSAS hubs. The overall difference between the local downlink transmission path and the local uplink transmission path could then be characterized by a (so-called) total ratio of (i) downlink CSI generated by comparing the known calibration signal to the calibration signal as received at the antenna module 206 to (ii) uplink CSI generated by comparing the calibration signal as received at the antenna module 206 to the calibration signal as received at the central controller 202.

To generate such a total ratio between the central controller and each of the M antenna modules, the above procedure would need to be implemented once for each different service antenna in the base station. As the number of service antennas in each base station becomes large, the cost of performing such calibrations becomes prohibitive. The following describes a practical, scalable approach to calibrating ratios for LSAS systems.

Each node (i.e., controller 202, each hub 204, and each antenna module 206) in base station 200 has a transceiver, such as transceiver 302 of FIG. 3. Two directly-connected nodes are called neighbors.

Figure 4:
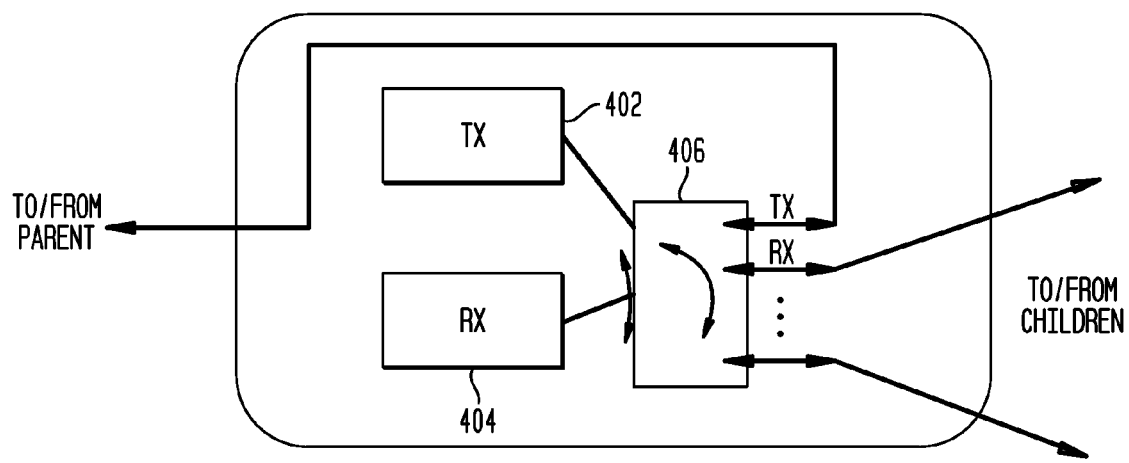
FIG. 4 shows a simplified block diagram of the transceiver of FIG. 3.

FIG. 4 shows a simplified block diagram of transceiver 302 of FIG. 3. Transmitter (TX) 402 can be selectively connected to the receivers of the node's parent and child(ren) through switch 406. Similarly, receiver (RX) 404 can be selectively connected to the transmitters of the node's parent and child (ren) through the same switch 406. The transceiver 302 in central controller 202 or a hub 204 uses the same frequency band as the transceiver in an antenna module 206 at a leaf for radio transmission to the terminals. Note that, as controlled by switch 406, transceiver 302 uses the same transmitter 402 on a time-division basis to transmit (i) downlink signals to its child(ren) and (ii) uplink signals to its parent. Similarly, as controlled by switch 406, transceiver 302 uses the same receiver 404 on a time-division basis to process (i) uplink signal received from its child(ren) and (ii) downlink signals received from its parent.

The downlink channel response $f_{i,j}$ from node i to a downstream neighbor node j can be expressed according to Equation (4) as follows:

$$f_{i,j} = t_i f'_{i,j} r_j,  \quad (4)$$

where:
 $t_i$ is the channel response of the transmit chain of node i (e.g., transmitter 402 and switch 406 of FIG. 4);
 $f'_{i,j}$ is the channel response of the wired downstream propagation path from node i to node j (i.e., the wire interconnecting nodes i and j); and
 $r_j$ is the channel response of the receive chain of node j (e.g., switch 406 and receiver 404 of FIG. 4).

Similarly, the uplink channel response $h_{i,j}$ from node j back to node i can be expressed according to Equation (5) as follows:

$$h_{i,j} = t_j h'_{i,j} r_i,  \quad (5)$$

where:
 $t_j$ is the channel response of the transmit chain of node j;
 $h'_{i,j}$ is the channel response of the wired propagation path from node j to node i; and
 $r_i$ is the channel response of the receive chain of node i.

The ratio $b_{i,j}$ characterizing the difference between the downlink channel response $f_{i,j}$ and the uplink channel response $h_{i,j}$ for two neighboring nodes i and j can be expressed according to Equation (6) as follows:

$$b_{i,j} = \frac{f_{i,j}}{h_{i,j}} = \frac{t_i \cdot f'_{i,j} \cdot r_j}{t_j \cdot h'_{i,j} \cdot r_i} = \frac{t_i \cdot r_j}{t_j \cdot r_i},  \quad (6)$$

since $f'_{i,j} = h'_{i,j}$ due to channel reciprocity (i.e., that the channel response for a wired (or over-the-air) propagation path is substantially identical for uplink and downlink transmissions when the same wire is used for both transmissions).

As described previously, a generic tree architecture may be said to have L levels, where Level 1 corresponds to the central controller (e.g., 202 in FIG. 2), Level L corresponds to the antenna modules (e.g., 206 in FIG. 2), and Levels 2 through L−1 correspond to the one or more intermediate levels of LSAS hubs (e.g., 204 in FIG. 2). The overall downlink transmission channel response $f_{1,L}$ from the central controller in Level 1 to a particular antenna module in Level L can be represented by the product of the corresponding neighbor downlink transmission channel responses $f_{i,j}$ of Equation (4), according to Equation (7) as follows:

$$f_{1,L} = f_{1,2} f_{2,3} \ldots f_{L-1,L}.  \quad (7)$$

Similarly, the overall uplink transmission channel response $h_{1,L}$ from that same antenna module in Level L to the central controller in Level 1 can be represented by the product of the corresponding neighbor uplink transmission channel responses $h_{i,j}$ of Equation (5), according to Equation (8) as follows:

$$h_{1,L} = h_{1,2} \cdot h_{2,3} \ldots h_{L-1,L}.  \quad (8)$$

Applying first Equations (7) and (8) and then Equation (6), the overall ratio $b_{1,L}$ between the overall downlink channel response $f_{1,L}$ and the overall uplink channel response $h_{1,L}$ for the central controller and that same antenna module can be expressed according to Equation (9) as follows:

$$b_{1,L} = \frac{f_{1,L}}{h_{1,L}} = \frac{f_{1,2} \cdot f_{2,3} \cdot \ldots \cdot f_{L-1,L}}{h_{1,2} \cdot h_{2,3} \cdot \ldots \cdot h_{L-1,L}} = b_{1,2} \cdot b_{2,3} \cdot \ldots \cdot b_{L-1,L} = \frac{t_1 \cdot r_2}{t_2 \cdot r_1} \cdot \frac{t_2 \cdot r_3}{t_3 \cdot r_2} \cdot \ldots \cdot \frac{t_{L-2} \cdot r_{L-1}}{t_{L-1} \cdot r_{L-2}} \cdot \frac{t_{L-1} \cdot r_L}{t_L \cdot r_{L-1}} = \frac{t_1}{r_1} \cdot \frac{r_L}{t_L}.  \quad (9)$$

Note that the reduction in Equation (9) follows from the fact that a node i having transceivers like transceiver 302 of FIG. 4 have (i) a single transmitter 402 that is used on a time-division basis for both uplink transmissions to node i−1 and downlink transmissions to node i+1 and (ii) a single receiver 404 that is used on a time-division basis for both downlink transmissions from node i−1 and uplink transmissions from node i+1. This means that (i) the channel response $t_i$ for the transmit chain of node i is the same for both uplink and downlink operations and (ii) the channel response $r_i$ for the receive chain of node i is the same for both uplink and downlink operations, which enables all but four of the t and r terms in Equation (9) to cancel one another.

Equation (9) implies that the overall ratio $b_{1,L}$ between the central controller at Level 1 and a antenna module at Level L can be generated by generating the (L−1) neighbor ratios $b_{i,j}$ of Equation (6) between each corresponding pair of neighbors i and j from Level 1 to Level L and multiplying those neighbor ratios together.

Referring to FIG. 4, to generate a neighbor ratio $b_{1,L}$ between (parent) node i in Level I and (child) node j in Level I+1, in a first phase, (i) the transceiver 302 in parent i is configured such that transmitter 402 is connected via switch 406 to the wired path corresponding to child j and (ii) the transceiver 302 in child j is configured such that receiver 404 is connected via switch 406 to the wired path corresponding to parent i. A known calibration signal is then transmitted from parent i to child j. In a second phase, (i) the transceiver 302 in child j is configured such that transmitter 402 is connected via switch 406 to the wired path corresponding to parent i and (ii) the transceiver 302 in parent i is configured such that receiver 404 is connected via switch 406 to the wired path corresponding to child j. The calibration signal as received at child j during the first phase is then transmitted from child j back to parent i. A known signal s is sent from parent i to child j (denote the received signal as $y_{i,j}$) and then from child j to parent i (denote the received signal as $y_{i,j}$).

The original known calibration signal s, the calibration signal $y_{i,j}$ as received at child j during the first phase, and the calibration signal $y_{i,j}$ as received at parent i during the second phase can then be processed to generate the neighbor ratio $b_{i,j}$. Specifically, $y_{i,j}=t_i*f_{i,j}*r_j*s$, $y_{j,i}=t_j*f_{j,i}*r_i*s$, $f_{i,j}=f_{j,i}$, therefore, $b_{i,j}=y_{i,j}/y_{j,i}$.

Although the disclosure has been described in the context of neighbor-calibration procedures in which node i in level I transmits the known calibration signal to node j in level I+1 and node j transmits the received calibration signal back to node i, neighbor-calibration procedures can also be implemented the other way around, with node j transmitting the known calibration signal to node i, and node i transmitting the received calibration signal back to node j.

Assume exemplary LSAS base station 200 of FIG. 2 having four levels (L=4), where the central controller 202 in Level 1 is connected to four LSAS hubs 204 in Level 2, each of which is connected to four LSAS hubs 204 in Level 3, each of which is connected to four antenna modules 206 in Level 4. As described previously, the overall ratios for such a base station having 64 antennas could be calibrated in 64 different calibration sessions, one for each of the 64 different service antennas.

Note, however, that the calibration procedure for the neighbor ratio between an LSAS hub in Level 3 and one of its child antenna modules in Level 4 can be performed at the same time as the calibration procedure for the neighbor ratio between each other LSAS hub in Level 3 and one of its child antenna modules in Level 4. In this way, all of the neighbor ratios between Level 3 and Level 4 can be completed in four sets of simultaneous calibration procedures, each set involving all four LSAS hubs in Level 3 and four different antenna modules in Level 4.

Note further that, at the same time that the first set of calibration procedures between Levels 3 and 4 are being performed, the calibration procedure for the neighbor ratio between the central controller 202 in Level 1 and one of its child LSAS hubs 204 in Level 2 can be performed. When the second set of procedures between Levels 3 and 4 are being performed, the calibration procedure for the neighbor ratio between the central controller in Level 1 and another of its child LSAS hubs in Level 2 can be performed, and so on. In this way, all four neighbor ratios between Levels 1 and 2 can be generated at the same time as the four sets of neighbor ratios between Levels 3 and 4.

After those first four sets of calibration procedures, only the neighbor ratios between Levels 2 and 3 need to be generated. Here, too, in similar fashion, those 16 neighbor ratios can be generated in another four sets of simultaneous calibration procedures. At that point, the various neighbor ratios can be used according to Equation (9) to generate the overall ratios for all 64 antennas in the LSAS base station 200. Thus, in about the same time that it takes to complete eight of the 64 different conventional calibration procedures of the prior art, all 64 overall ratios can be generated according to the present disclosure.

In general, for a generic LSAS base station, the neighbor ratios between parent nodes in all of the odd-numbered levels (i.e., Levels 1, 3, et seq.) and their children nodes in even-numbered levels (i.e., Levels 2, 4, et seq.) can be generated in a first (i.e., odd) neighbor-calibration phase. The duration of that first calibration phase will be dictated by the odd-level parent node having the most children (i.e., the largest fan-out value). After that first phase, the neighbor ratios between parent nodes in all of the even-numbered levels (i.e., Levels 2, 4, et seq.) and their children nodes in odd-numbered levels (i.e., Levels 3, 5, et seq.) can be generated in a second (i.e., even) neighbor-calibration phase. The duration of that second calibration phase will be dictated by the even-level parent node having the largest fan-out value). Note that the order of the two calibration phases can be reversed (i.e., first even-level parents, then odd-level parents).

Note that, at any given time, simultaneous neighbor-calibration procedures involve only independent pairs of neighboring nodes, where independent pairs do not have any nodes in common.

For a generic LSAS base station having M antennas and a maximum fan-out value of d (i.e., the maximum number of children nodes for any parent node in the tree architecture), the amount of time to calibrate all of the antennas is proportional to $2d+\log_d(M)$ as compared to the prior-art value of M. For LSAS base stations having large numbers of antennas, this can result in significant cost savings. It also suggests the advantages of provisioning LSAS base stations using a thick tree architecture that strikes a balance between the number of levels, the uniformity of the fan-out values within each level, and the uniformity of maximum fan-out values across different levels.

At the end of the odd and even neighbor-calibration phases, the central controller in Level 1 and each LSAS hub in Levels 2 to L−1 will have generated the neighbor ratio for each of its child nodes in Levels 2 to L, respectively. In one implementation, the central controller in Level 1 transmits to each of its child nodes (e.g., LSAS hub) in Level 2 its corresponding calibrated neighbor ratio. Each hub in Level 2 multiplies the value received from its parent (i.e., the central controller) in Level 1 with the calibrated neighbor ratio for each of its child nodes in Level 3 and transmits the resulting product to that child node. Each node in Level 3 multiplies the value received from its parent in Level 2 with the calibrated neighbor ratio for each of its child nodes in Level 4 and transmits the resulting product to that child node. This process continues until each LSAS hub in Level L−1 multiplies the value received from its parent in Level L−2 with the calibrated neighbor ratio for each of its child nodes (i.e., antenna modules) in Level L and transmits to that antenna module the resulting product, which is the overall ratio between the central controller and that service antenna. Each antenna module can then use that calibrated overall ratio to pre-process downlink signals for transmission to the terminals.

Although the disclosure has been described in the context of the particular tree architecture of FIG. 2, those skilled in the art will understand that the disclosure can be implemented in a wide variety of different tree architectures having different numbers of levels and different and differing fan-out values for different nodes.

According to an example embodiment disclosed above in reference to FIGS. 1-4, provided is a method for calibrating a base station having a plurality of nodes comprising a central controller, a plurality of hubs, and a plurality of antenna modules connected in an L-level tree architecture, wherein the central controller is at Level 1 of the tree architecture and is connected to one or more hubs at Level 2; each hub at Level I, $1<I<L-1$, is connected to one or more hubs at Level I+1; and each hub at Level L−1 is connected to one or more antenna modules at Level L, the method comprising (a) generating a neighbor ratio between each parent node at Level i, $0<i<L$, and each of its one or more child nodes at Level i+1; and (b) generating an overall ratio between the central controller and each antenna module based on a corresponding subset of the neighbor ratios.

In some embodiments of the method, step (a) comprises (a1) generating the neighbor ratios for odd values of i in an odd calibration phase; and (a2) generating the neighbor ratios for even values of i in an even calibration phase.

In some embodiments of any of the above methods, the nodes in the odd levels have a first maximum fan-out value d1;

the nodes in the even levels have a second maximum fan-out value d2; the odd calibration phase comprises d1 sets of calibration procedures; and the even calibration phase comprises d2 sets of calibration procedures.

In some embodiments of any of the above methods, during at least one of the d1 sets of calibration procedures of the odd calibration phase, multiple neighbor ratios for independent pairs of neighboring nodes are generated simultaneously; and during at least one of the d2 sets of calibration procedures of the even calibration phase, multiple neighbor ratios for independent pairs of neighboring nodes are generated simultaneously.

In some embodiments of any of the above methods, wherein step (b) comprises generating the overall ratios for the plurality of antenna modules by propagating calibrated ratios from the central controller to the antenna modules, wherein a hub at Level j, $1<j<L$, receives a calibrated ratio from its parent, multiplies the received calibrated ratio by each of its one or more calibrated neighbor ratios with its one or more children, and transmits a resulting product calibrated ratio to each corresponding child.

In some embodiments of any of the above methods, each neighbor ratio for neighboring nodes i and j is generated by (a1) transmitting a known calibration signal from node i to node j; (a2) receiving at node j the calibration signal transmitted from node i; (a3) transmitting the received calibration signal from node j back to node i; (a4) receiving at node i the received calibration signal transmitted from node j; and (a5) processing the known calibration signal, the calibration signal received at node j, and the calibration signal received at node i to generate the neighbor ratio.

In some embodiments of any of the above methods, each node has a transmitter and a receiver, each of which is used on a time-division basis to support both uplink and downlink operations.

In some embodiments of any of the above methods, each antenna module uses its overall ratio to pre-compensate downlink signals for transmission to terminals.

According to another example embodiment disclosed above in reference to FIGS. 1-4, provided is a base station configured to perform any of the above methods.

According to yet another example embodiment disclosed above in reference to FIGS. 1-4, provided is a base station having a plurality of nodes comprising a central controller, a plurality of hubs, and a plurality of antenna modules connected in an L-level tree architecture, wherein the central controller is at Level 1 of the tree architecture and is connected to one or more hubs at Level 2; each hub at Level I, $1<I<L-1$, is connected to one or more hubs at Level I+1; and each hub at Level L−1 is connected to one or more antenna modules at Level L, the base station is configured to (a) generate a neighbor ratio between each parent node at Level i, $0<i<L$, and each of its one or more child nodes at Level i+1; and (b) generate an overall ratio between the central controller and each antenna module based on a corresponding subset of the neighbor ratios.

In some embodiments of the above base station, the base station is configured to (a1) generate the neighbor ratios for odd values of i in an odd calibration phase; and (a2) generate the neighbor ratios for even values of i in an even calibration phase.

In some embodiments of any of the above base stations, the nodes in the odd levels have a first maximum fan-out value d1; the nodes in the even levels have a second maximum fan-out value d2; the odd calibration phase comprises d1 sets of calibration procedures; and the even calibration phase comprises d2 sets of calibration procedures.

In some embodiments of any of the above base stations, during at least one of the d1 sets of calibration procedures of the odd calibration phase, multiple neighbor ratios for independent pairs of neighboring nodes are generated simultaneously; and during at least one of the d2 sets of calibration procedures of the even calibration phase, multiple neighbor ratios for independent pairs of neighboring nodes are generated simultaneously.

In some embodiments of any of the above base stations, the base station is configured to generate the overall ratios for the plurality of antenna modules by propagating calibrated ratios from the central controller to the antenna modules, wherein a hub at Level j, $1<j<L$, receives a calibrated ratio from its parent, multiplies the received calibrated ratio by each of its one or more calibrated neighbor ratios with its one or more children, and transmits a resulting product calibrated ratio to each corresponding child.

In some embodiments of any of the above base stations, each neighbor ratio for neighboring nodes i and j is generated by (a1) node i transmitting a known calibration signal to node j; (a2) node j receiving the calibration signal transmitted from node i; (a3) node j transmitting the received calibration signal back to node i; (a4) node i receiving the received calibration signal transmitted from node j; and (a5) processing the known calibration signal, the calibration signal received at node j, and the calibration signal received at node i to generate the neighbor ratio.

In some embodiments of any of the above base stations, each node has a transmitter and a receiver, each of which is used on a time-division basis to support both uplink and downlink operations.

In some embodiments of any of the above base stations, each antenna module uses its overall ratio to pre-compensate downlink signals for transmission to terminals.

Embodiments of the invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method for calibrating a base station having a plurality of nodes comprising a central controller, a plurality of hubs, and a plurality of antenna modules connected in an L-level tree architecture, where the central controller is at Level 1 of the tree architecture and is connected to one or more hubs at Level 2; each hub at Level I, $1<I<L-1$, is connected to one or more hubs at Level I+1; and each hub at Level L-1 is connected to one or more antenna modules at Level L, the method comprising:

step (a) generating a neighbor ratio between each parent node at Level i, $0<i<L$, and each of its one or more child nodes at Level i+1; and step (b) generating an overall ratio between the central controller and each antenna module based on a corresponding subset of the neighbor ratios, wherein step (a) comprises:
(a1) generating the neighbor ratios for odd values of i in an odd calibration phase; and
(a2) generating the neighbor ratios for even values of i in an even calibration phase.

2. The method of claim 1, wherein:
the nodes in the odd levels have a first maximum fan-out value d1;
the nodes in the even levels have a second maximum fan-out value d2;
the odd calibration phase comprises d1 sets of calibration procedures; and
the even calibration phase comprises d2 sets of calibration procedures.

3. The method of claim 2, wherein:
during at least one of the d1 sets of calibration procedures of the odd calibration phase, multiple neighbor ratios for independent pairs of neighboring nodes are generated simultaneously; and
during at least one of the d2 sets of calibration procedures of the even calibration phase, multiple neighbor ratios for independent pairs of neighboring nodes are generated simultaneously.

4. The method of claim 1, wherein step (b) comprises generating the overall ratios for the plurality of antenna modules by propagating calibrated ratios from the central controller to the antenna modules, wherein a hub at Level j, $1<j<L$, receives a calibrated ratio from its parent, multiplies the received calibrated ratio by each of its one or more calibrated neighbor ratios with its one or more children, and transmits a resulting product calibrated ratio to each corresponding child.

5. The method of claim 1, wherein each neighbor ratio for neighboring nodes i and j is generated by:
(a1) transmitting a known calibration signal from node i to node j;
(a2) receiving at node j the calibration signal transmitted from node i;
(a3) transmitting the received calibration signal from node j back to node i;
(a4) receiving at node i the received calibration signal transmitted from node j; and
(a5) processing the known calibration signal, the calibration signal received at node j, and the calibration signal received at node i to generate the neighbor ratio.

6. The method of claim 5, wherein each node has a transmitter and a receiver, each of which is used on a time-division basis to support both uplink and downlink operations.

7. The method of claim 1, wherein each antenna module uses its overall ratio to pre-compensate downlink signals for transmission to terminals.

8. A base station configured to perform the method of claim 1.

9. A base station having a plurality of nodes comprising a central controller, a plurality of hubs, and a plurality of antenna modules connected in an L-level tree architecture, wherein: the central controller is at Level 1 of the tree architecture and is connected to one or more hubs at Level 2; each hub at Level I, $1<I<L-1$, is connected to one or more hubs at Level I+1; and each hub at Level L-1 is connected to one or more antenna modules at Level L, wherein the base station is configured to:
step (a) generate a neighbor ratio between each parent node at Level i, $0<i<L$, and each of its one or more child nodes at Level i+1; and step (b) generate an overall ratio between the central controller and each antenna module based on a corresponding subset of the neighbor ratios, wherein the base station is configured to:
- (a1) generate the neighbor ratios for odd values of i in an odd calibration phase; and
- (a2) generate the neighbor ratios for even values of i in an even calibration phase.

10. The base station of claim 9, wherein:
the nodes in the odd levels have a first maximum fan-out value d1;
the nodes in the even levels have a second maximum fan-out value d2;
the odd calibration phase comprises d1 sets of calibration procedures; and
the even calibration phase comprises d2 sets of calibration procedures.

11. The base station of claim 10, wherein:
during at least one of the d1 sets of calibration procedures of the odd calibration phase, multiple neighbor ratios for independent pairs of neighboring nodes are generated simultaneously; and
during at least one of the d2 sets of calibration procedures of the even calibration phase, multiple neighbor ratios for independent pairs of neighboring nodes are generated simultaneously.

12. The base station of claim 9, wherein the base station is configured to generate the overall ratios for the plurality of antenna modules by propagating calibrated ratios from the central controller to the antenna modules, wherein a hub at Level j, $1<j<L$, receives a calibrated ratio from its parent, multiplies the received calibrated ratio by each of its one or more calibrated neighbor ratios with its one or more children, and transmits a resulting product calibrated ratio to each corresponding child.

13. The base station of claim 9, wherein each neighbor ratio for neighboring nodes i and j is generated by:
- (a1) node i transmitting a known calibration signal to node j;
- (a2) node j receiving the calibration signal transmitted from node i;
- (a3) node j transmitting the received calibration signal back to node i;
- (a4) node i receiving the received calibration signal transmitted from node j; and
- (a5) processing the known calibration signal, the calibration signal received at node j, and the calibration signal received at node i to generate the neighbor ratio.

14. The base station of claim 13, wherein each node has a transmitter and a receiver, each of which is used on a time-division basis to support both uplink and downlink operations.

15. The base station of claim 9, wherein each antenna module uses its overall ratio to pre-compensate downlink signals for transmission to terminals.

16. A method for calibrating a base station having a plurality of nodes comprising a central controller, a plurality of hubs, and a plurality of antenna modules connected in an L-level tree architecture, wherein the central controller is at Level 1 of the tree architecture and is connected to one or more hubs at Level 2; each hub at Level I, $1<I<L-1$, is connected to one or more hubs at Level I+1; and each hub at Level L−1 is connected to one or more antenna modules at Level L, the method comprising:
- (a) generating a neighbor ratio between each parent node at Level i, $0<i<L$, and each of its one or more child nodes at Level i+1; and
- (b) generating an overall ratio between the central controller and each antenna module based on a corresponding subset of the neighbor ratios, wherein step (b) comprises generating the overall ratios for the plurality of antenna modules by propagating calibrated ratios from the central controller to the antenna modules, wherein a hub at Level j, $1<j<L$, receives a calibrated ratio from its parent, multiplies the received calibrated ratio by each of its one or more calibrated neighbor ratios with its one or more children, and transmits a resulting product calibrated ratio to each corresponding child.

17. A method for calibrating a base station having a plurality of nodes comprising a central controller, a plurality of hubs, and a plurality of antenna modules connected in an L-level tree architecture, wherein the central controller is at Level 1 of the tree architecture and is connected to one or more hubs at Level 2; each hub at Level I, $1<I<L-1$, is connected to one or more hubs at Level I+1; and each hub at Level L−1 is connected to one or more antenna modules at Level L, the method comprising:
- (a) generating a neighbor ratio between each parent node at Level i, $0<i<L$, and each of its one or more child nodes at Level i+1; and
- (b) generating an overall ratio between the central controller and each antenna module based on a corresponding subset of the neighbor ratios, wherein each neighbor ratio for neighboring nodes i and j is generated by:
  - (a1) transmitting a known calibration signal from node i to node j;
  - (a2) receiving at node j the calibration signal transmitted from node i;
  - (a3) transmitting the received calibration signal from node j back to node i;
  - (a4) receiving at node i the received calibration signal transmitted from node j; and
  - (a5) processing the known calibration signal, the calibration signal received at node j, and the calibration signal received at node i to generate the neighbor ratio.

18. The method of claim 17, wherein each node has a transmitter and a receiver, each of which is used on a time-division basis to support both uplink and downlink operations.

\* \* \* \* \*